United States Patent
Ghasiri

(10) Patent No.: US 11,204,054 B2
(45) Date of Patent: *Dec. 21, 2021

(54) STAMPED HOUSINGS TO FACILITATE ASSEMBLY AND RELATED METHODS

(71) Applicant: Bal Seal Engineering, LLC, Foothill Ranch, CA (US)

(72) Inventor: Majid Ghasiri, Foothill Ranch, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,656

(22) Filed: Dec. 20, 2019

(65) Prior Publication Data

US 2020/0132102 A1 Apr. 30, 2020

Related U.S. Application Data

(63) Continuation of application No. 15/068,605, filed on Mar. 13, 2016, now Pat. No. 10,520,001.

(60) Provisional application No. 62/133,194, filed on Mar. 13, 2015.

(51) Int. Cl.
*F16B 21/18* (2006.01)
(52) U.S. Cl.
CPC ................... *F16B 21/186* (2013.01)
(58) Field of Classification Search
CPC .................................................. F16B 21/186
See application file for complete search history.

(56) References Cited

U.S. PATENT DOCUMENTS

| | | | | |
|---|---|---|---|---|
| 3,174,500 A | * | 3/1965 | Johnson | C01G 43/06 137/119.09 |
| 4,678,210 A | * | 7/1987 | Balsells | F16L 37/084 285/306 |
| 4,872,710 A | * | 10/1989 | Konecny | F16L 37/084 285/81 |

(Continued)

FOREIGN PATENT DOCUMENTS

| | | |
|---|---|---|
| DE | 19807663 | 9/1999 |
| DE | 10 2009 030 463 A1 | 12/2010 |

(Continued)

OTHER PUBLICATIONS

Search Report and Written Opinion from FR Intellectual Property Office on corresponding FR Application (FR1652095) dated May 17, 2019.

(Continued)

*Primary Examiner* — Bayan Salone
(74) *Attorney, Agent, or Firm* — Klein, O'Neill & Singh, LLP

(57) ABSTRACT

Connector housings and connector assemblies for mechanically connecting a pin to a housing with or without electrical conductivity. A connector housing can be formed by attaching two housing sections together with one or both housing sections formed at least in part by a stamping process. The connector housing can have an outer contour, such as an outer perimeter, with one or more sides and with a joining section connecting two adjacent sides together. The two or more sides can be used for handling, aligning, and/or assembling of the connector housing to a cavity.

20 Claims, 8 Drawing Sheets

(56) References Cited

U.S. PATENT DOCUMENTS

| | | | | |
|---|---|---|---|---|
| 5,411,348 A | * | 5/1995 | Balsells | F16F 1/045 403/326 |
| 5,545,842 A | * | 8/1996 | Balsells | H05K 9/0016 174/372 |
| 5,570,719 A | * | 11/1996 | Richards | B67D 7/0478 137/614.04 |
| 6,672,565 B2 | | 1/2004 | Russell | E21B 21/106 251/297 |
| 6,835,084 B2 | * | 12/2004 | Poon | A61M 5/00 439/349 |
| 6,878,013 B1 | * | 4/2005 | Behan | A61N 1/3752 439/335 |
| 7,047,077 B2 | * | 5/2006 | Hansen | A61N 1/3752 607/37 |
| 7,195,523 B2 | * | 3/2007 | Naviaux | A61N 1/3752 439/668 |
| 7,299,095 B1 | * | 11/2007 | Barlow | A61N 1/3752 607/36 |
| 7,538,289 B2 | * | 5/2009 | Carroll | B60H 1/3442 200/277 |
| 7,722,415 B2 | * | 5/2010 | Chansrivong | H01R 13/15 439/840 |
| 7,914,315 B2 | * | 3/2011 | Kuhn | A61C 1/18 439/345 |
| 7,914,351 B2 | * | 3/2011 | Balsells | H01R 13/187 439/840 |
| 8,052,459 B2 | * | 11/2011 | Smith | H01R 13/187 439/372 |
| 8,096,842 B2 | * | 1/2012 | Poon | H01L 31/0508 439/840 |
| 8,308,167 B2 | * | 11/2012 | Balsells | A61B 17/162 279/23.1 |
| 8,382,532 B2 | * | 2/2013 | Sjostedt | H01R 13/187 439/817 |
| 8,428,724 B2 | * | 4/2013 | Sage | H01R 13/187 607/37 |
| 8,491,346 B2 | * | 7/2013 | Sjostedt | H01R 13/2421 439/840 |
| 8,561,274 B2 | * | 10/2013 | Balsells | F16L 37/084 |
| 9,004,805 B2 | * | 4/2015 | Changsrivong | F16B 21/18 403/327 |
| 9,267,526 B2 | * | 2/2016 | Balsells | F16L 37/22 |
| 9,284,970 B2 | * | 3/2016 | Dilmaghanian | F16B 17/00 |
| 9,312,630 B2 | * | 4/2016 | Huang | H01R 13/62 |
| 9,482,255 B2 | * | 11/2016 | Changsrivong | H01R 13/187 |
| 9,500,211 B2 | * | 11/2016 | Changsrivong | F16B 21/183 |
| 9,534,625 B2 | * | 1/2017 | Balsells | F16F 1/045 |
| 9,677,587 B2 | * | 6/2017 | Changsrivong | F16B 21/186 |
| 10,520,001 B2 | * | 12/2019 | Ghasiri | F16B 21/186 |
| 2002/0122690 A1 | * | 9/2002 | Poon | H01R 13/187 403/326 |
| 2003/0096526 A1 | * | 5/2003 | Balsells | H01R 13/187 439/346 |
| 2006/0228166 A1 | * | 10/2006 | Balsells | F16C 11/069 403/57 |
| 2010/0279558 A1 | * | 11/2010 | Leon | H01R 13/2421 439/817 |
| 2013/0149031 A1 | * | 6/2013 | Changsrivong | F16B 21/186 403/376 |
| 2014/0079476 A1 | * | 3/2014 | Dilmaghanian | F16F 1/045 403/328 |
| 2014/0130329 A1 | | 5/2014 | Changsrivong et al. | |
| 2014/0162487 A1 | | 6/2014 | Frederick et al. | |
| 2014/0336735 A1 | * | 11/2014 | Kane | A61N 1/3752 607/116 |
| 2014/0378008 A1 | | 12/2014 | Young et al. | |
| 2016/0076568 A1 | | 3/2016 | Dilmaghanian et al. | |
| 2016/0204557 A1 | | 7/2016 | Kim | |
| 2016/0265574 A1 | * | 9/2016 | Ghasiri | F16B 21/186 |
| 2017/0352984 A1 | | 12/2017 | Changsrivong et al. | |
| 2017/0373425 A1 | | 12/2017 | Rust | |

FOREIGN PATENT DOCUMENTS

| | | |
|---|---|---|
| GB | 2194298 | 3/1988 |
| WO | WO 03067713 | 8/2003 |

OTHER PUBLICATIONS

Non-Final Office Action on co-pending US application (U.S. Appl. No. 15/068,605) dated Oct. 15, 2018.

Bal Seal Canted Coil Springs, Circular and Spring Lengths for Radial and Axial Loading, Calatog No. DM3Mm, Rev. A, Jul. 17, 1992, Bal Seal Engineering Company, Inc., Santa Ana, CA, U.S.A., (24 pages).

Latching and Holding With Bal Seal Canted-Coil Circular Welding Springs, Product News #164D, Nov. 23, 1991, Bal Seal Engineering Company, Inc., Santa Ana, California, U.S.A., (6 pages).

Office Action on corresponding foreign application (DE Application No. 10 2016 104 620.5) from the German Patent Office dated Aug. 2, 2021.

\* cited by examiner

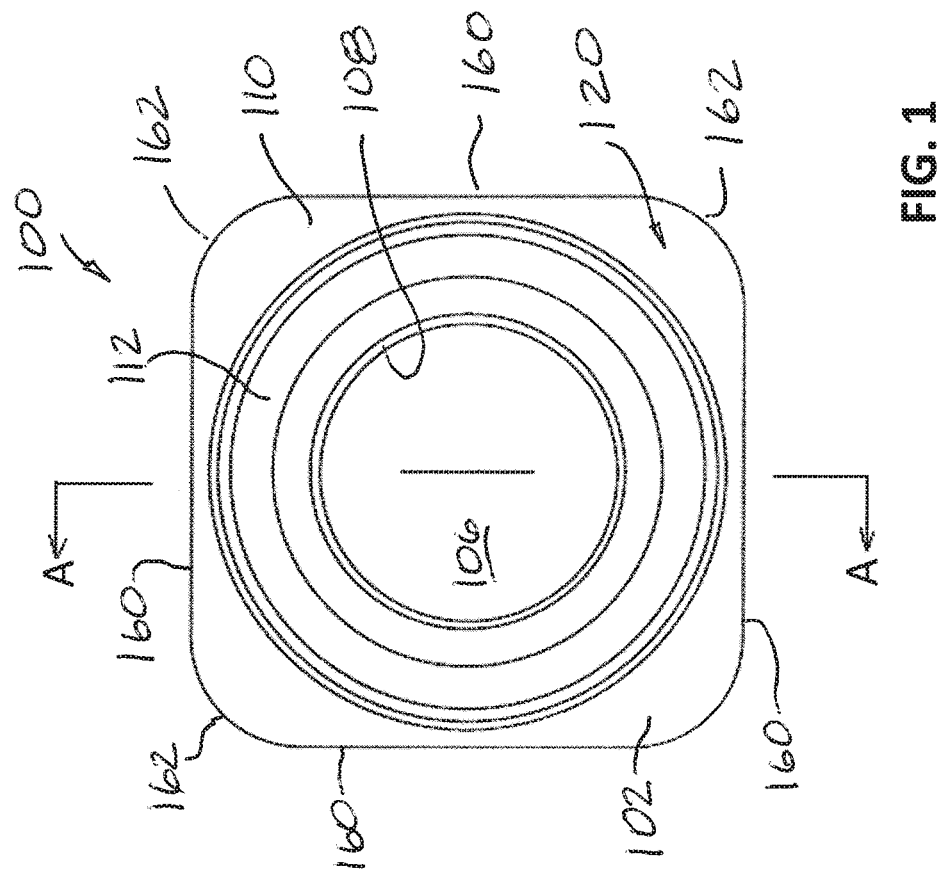
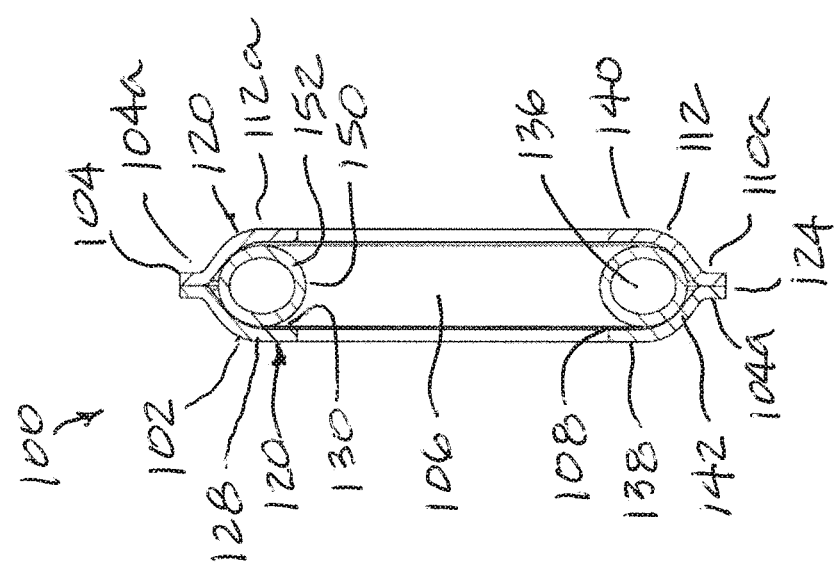

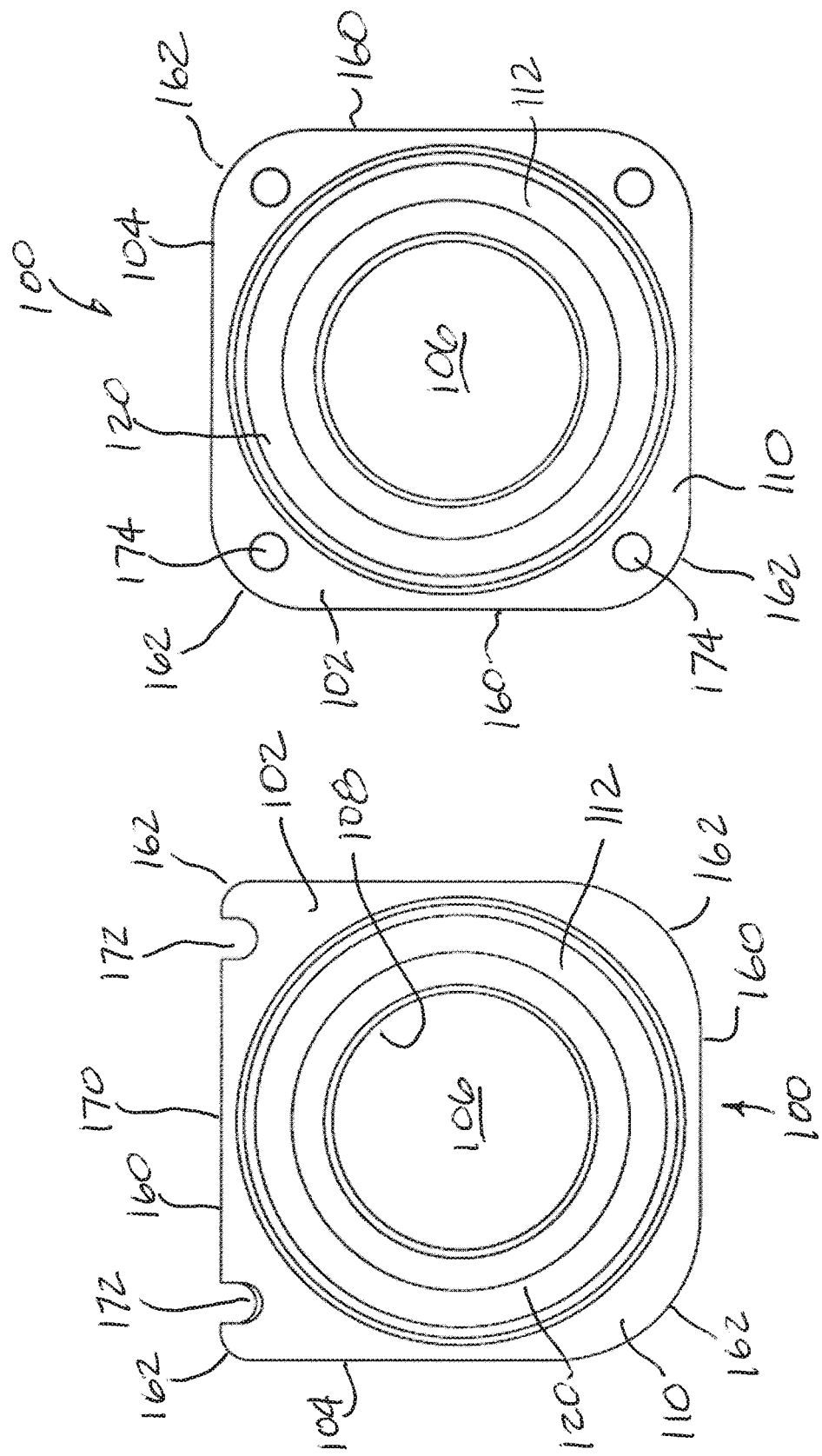

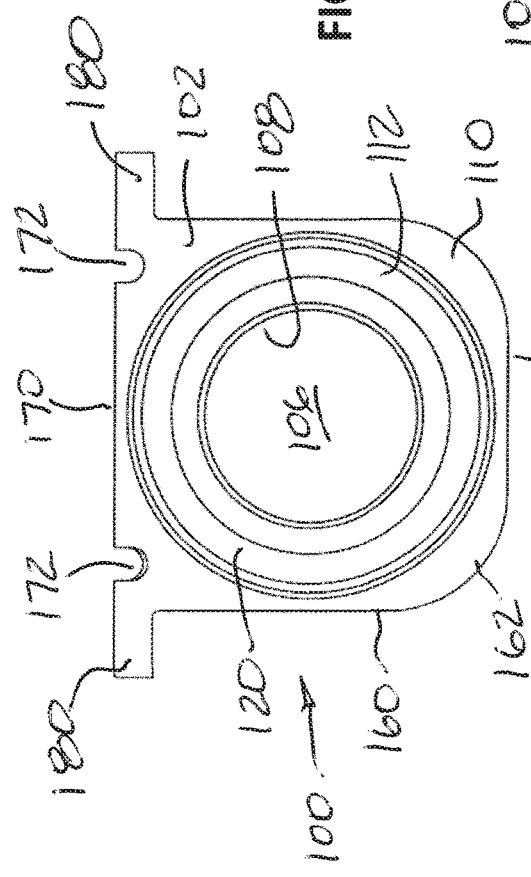
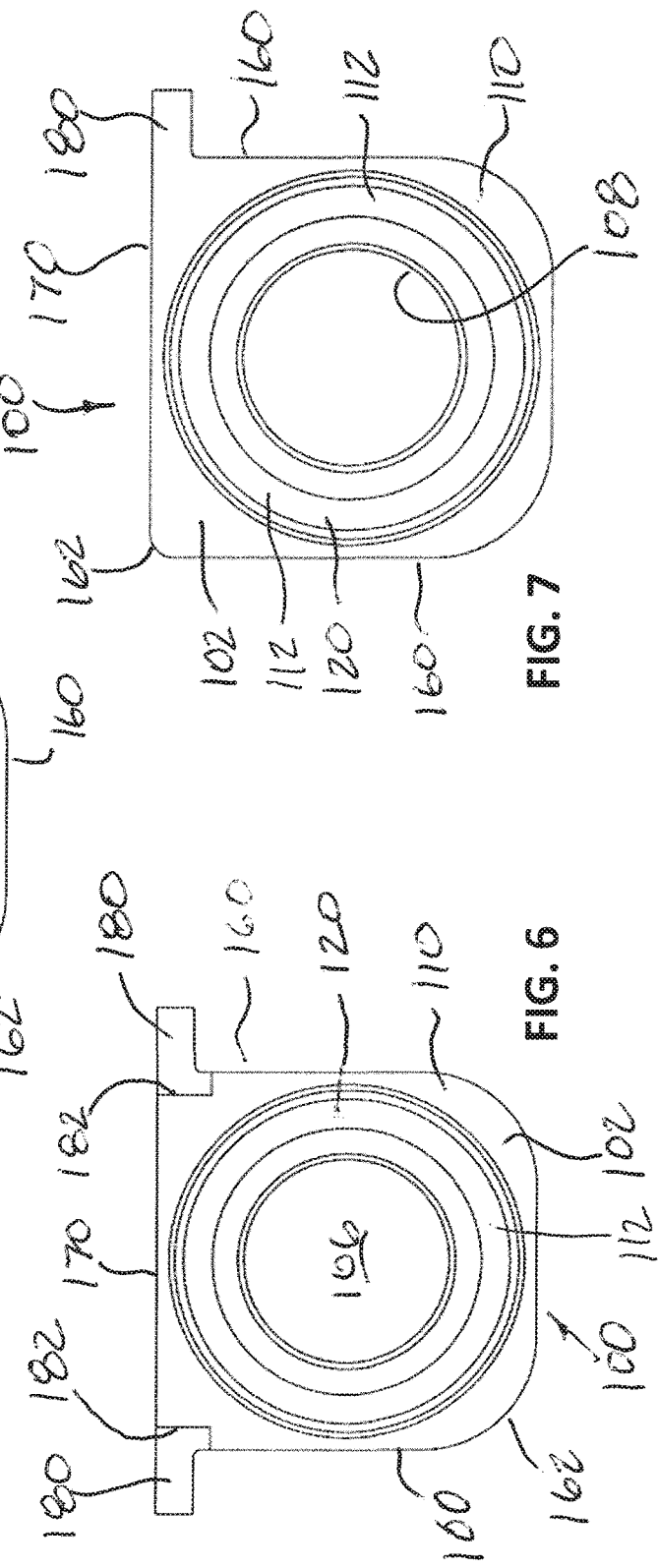
FIG. 5
FIG. 6
FIG. 7

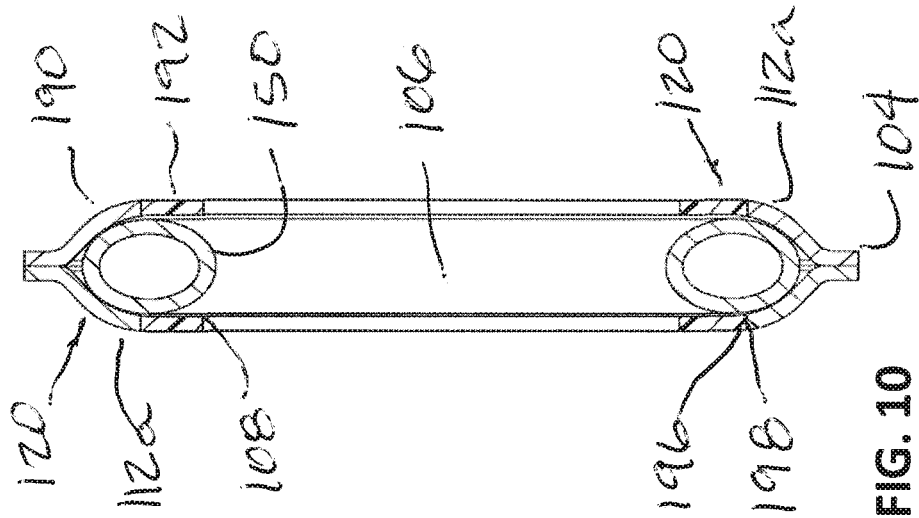
FIG. 10
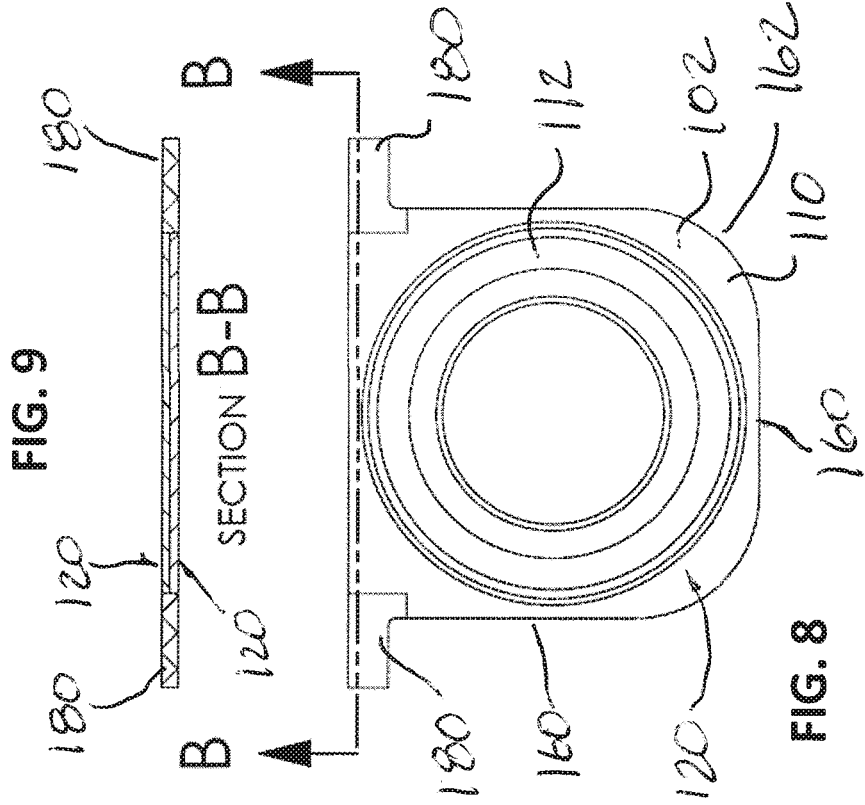
FIG. 9
FIG. 8

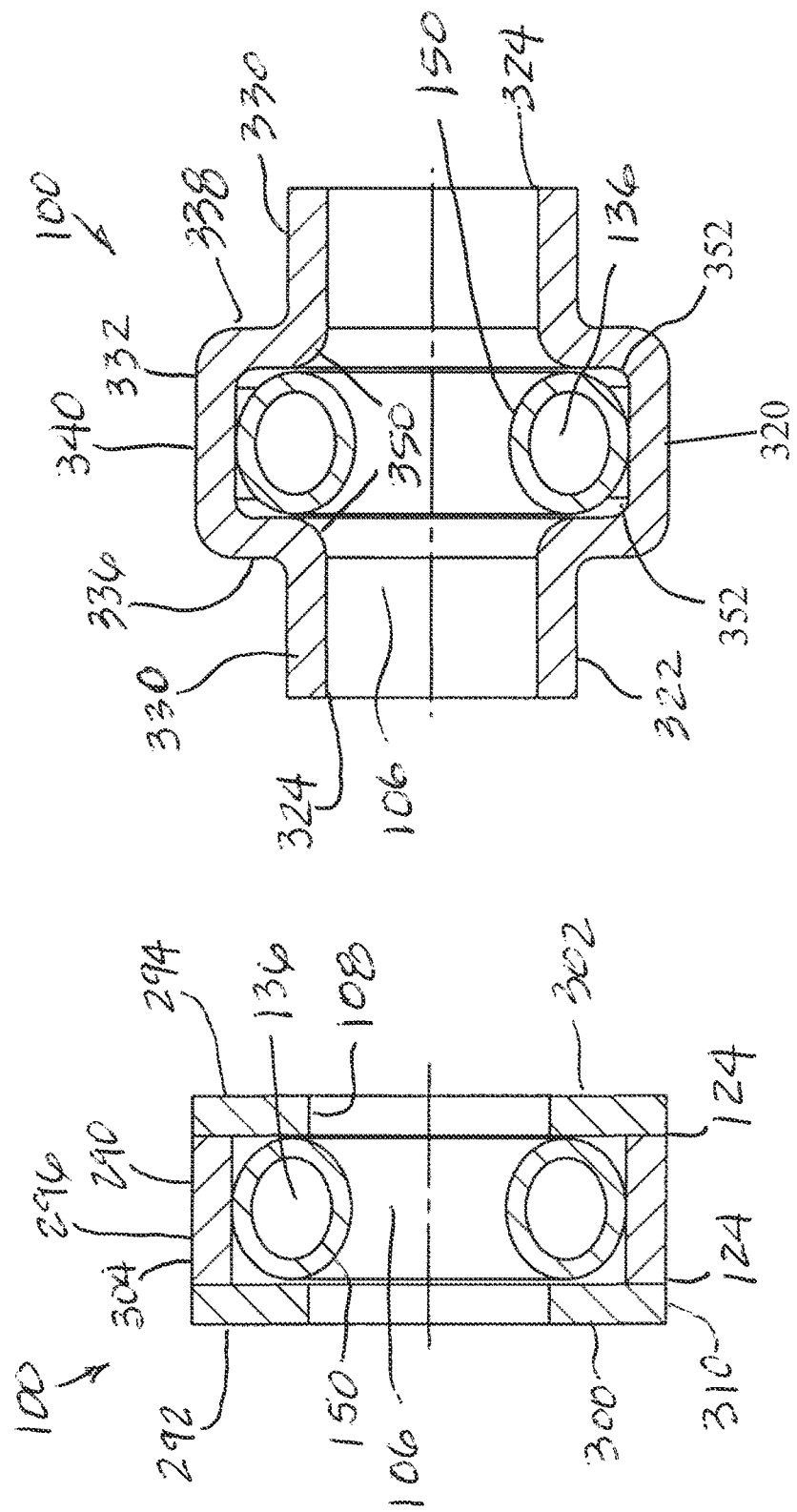

STAMPED HOUSINGS TO FACILITATE ASSEMBLY AND RELATED METHODS

FIELD OF ART

The present disclosure is generally related to connector assemblies having a housing, a pin, and a canted coil spring in between acting as a medium for holding, latching, or locking the pin to the housing with specific discussions on connector assemblies having a housing stamped housing piece or pieces and related methods.

BACKGROUND

Connector assemblies are known for use as mechanical fasteners, as latching connectors, as holding connectors and as locking connectors. These connectors typically have a housing with a bore and a pin either with or without a pin groove. A spring is placed in the groove, either of the housing or the pin, for forming a connection between the pin and the housing, which can be a holding connection type, a latching connection type in which the pin is allowed to be removed from the housing, or a locking connection type in which the pin is not allowed to be removed from the housing unless the connector, such as the spring, is destroyed. When the housing and the pin are coupled to an electrical source or node to pass current or electrical signals there-across, the connector can also carry current and functions as an electrical connector. Exemplary connectors are disclosed in U.S. Pat. Nos. 4,678,210; 5,082,390; 5,411,348; and 8,297,662.

SUMMARY

Connector housings, connector assemblies and their components for mechanically connecting a pin to a housing with or without electrical conductivity are disclosed. A connector housing in accordance with the present disclosure can be formed by attaching two housing sections together with one or both housing sections formed at least in part by a stamping process. The connector housing can have an outer contour, such as an outer perimeter, with one or more sides and with a joining section connecting two adjacent sides together. The two or more sides can be used for handling, aligning, and/or assembling of the connector housing to a cavity. Connector assemblies are disclosed each with a first housing section and a second housing section joined together along a seam.

The two housing sections can be identical or be different. The outer perimeters of the two housing sections can be the same or be different. When two housing sections are assembled, the connector housing formed hereby has a housing perimeter. Different housing sections can form a spring groove with non-symmetrical groove shape, such as along the seam.

A canted coil spring can be used with a spring groove of the connector housing. The canted coil spring can be a radial canted coil spring or an axial canted coil spring. Optionally, a ribbon spring or a V-spring can be used instead of a canted coil spring.

A pin with or without a pin groove can be inserted into a bore of the housing and into the spring center of the canted coil spring to hold, latch, or lock the pin and the housing to one another.

A canted coil spring usable herein comprises a plurality of coils canted in the same general direction with each coil comprising a major axis and a minor axis.

The coils can expand and compress like a traditional helical compression or extension spring but can also cant or deflect along a radial direction relative to the axis passing through the plurality of canted coils, unlike traditional helical compression or extension spring. In other examples, the spring can be a garter spring, a cantilever spring, or a ribbon spring.

Exemplary canted coil springs are disclosed in U.S. Pat. Nos. 4,655,462; 4,826,144; and 4,876,781, the contents of which are expressly incorporated herein by reference.

The canted coil spring usable herein can be made from a conductive metal, such as a conductive metal wire, and may be plated or cladded with one or more outer layers over a base metallic layer. As used herein, conductive metal means any metal capable of conducting current, such as steel, stainless steel, copper, and gold. In certain embodiments, a preferred conductive metal, such as copper, copper alloy, or a preferred combination, such as copper with silver or other noble metal cladding, may be used.

The housing or connector housing comprises a body having a housing perimeter and a bore defined by an inside perimeter. The body can comprise a flange section and a contoured or shaped section located radially inwardly from the flange section. The contoured section can define a spring groove.

In an example, the connector housing is formed by joining two or more housing sections together. The two or more housing sections can be joined by various means, including by welding their perimeters together, by crimping the perimeters, by using fasteners, or by using rivets.

The body of the housing can be formed by securing two housing sections together, such as by welding the outer perimeter of the two housing sections together. The size of the inside perimeter and the overall size of the connector housing can be selected for different applications.

The two housing sections has a seam therebetween. The outer perimeter of the two housing sections can be the same, such as the same shape and/or size, so that the outer edges of the respective outer perimeters can share a common outer perimeter. In other examples, the outer perimeter of each housing section can be different from the other in shape and/or size so that while they can still share a seam therebetween, there is no common outer perimeter.

Each housing section can have a flange structure, a contoured or shaped structure, an exterior surface, and an interior surface. Each housing section can have opening defined by an interior perimeter, which defines a bore for receiving a pin. In an example, the two housing sections can contact one another at the interior surfaces of their respective flange structures, at or adjacent the outer perimeters, as opposed to contacting at the edges of their respective outer perimeters.

A spring groove is defined by the two housing sections. The spring groove can comprise two sidewalls and a bottom wall located therebetween.

The two sidewalls of the spring groove can be formed from all or part of the contoured structures of the two housing sections. The bottom wall can also be formed by the two contoured structures and can have a seam passing therethrough.

The spring groove has a width measured by the spacing between the two sidewalls and a groove depth measured from the groove bottom to a point defined by the two inside perimeters of the two housing sections.

In an example, the groove depth and the groove width can be selected so as to accommodate an axial canted coil spring, a radial canted coil spring, or either of the radial or axial spring but rotated from each spring's normal coiled position. For example, when using a radial canted coil spring, the major axis can be rotated from horizontal or when using an axial canted coil spring, the major axis can be rotated from vertical.

Both horizontal and vertical reference points can be measured relative to a housing axis passing through the bore of the housing. The lengthwise axis of the pin can alternative be used as a reference point.

The spring groove can have two generally parallel sidewalls. The sidewalls 138, 140 can alternatively converge or diverge from one another, such as being tapered as opposed to orthogonal to the housing axis.

The bottom wall can be general U-shaped, generally V-shaped, can have a flat bottom, or can have a single taper as opposed to being parallel to the housing axis. The various groove geometries of the spring groove can be implemented, formed, or adjusted by changing the shape of the contoured structures of the two housing sections.

The assembled housing sections with a spring groove and a canted coil spring can accept a pin or a shaft so that the canted coil spring is biased between the housing and the shaft. A pin or piston can be inserted in through the bore of the housing and the pin can either latch to the housing via the canted coil spring, lock to the housing, or be held to the housing by the canted coil spring.

One or both housing sections can be formed by cold working a metal piece to shape the metal piece into the shaped housing section shown. For example, for a two-piece connector housing, both housing sections can be formed by cold working a metal piece, only one housing section is formed by cold working a metal piece while the other is machined, or both housing sections can have sections formed by cold-working while other sections by machining. By cold-working, it is understood that the forming or working process to shape the metal work piece is not performed during casting since some heat may be used during the forming process.

The two housing sections can be substantially identical or be different, such as to produce a non-symmetrical spring groove about the seam. In some examples, the housing section can have both a cold-worked section and a machined section, such as a cut or a lathed inner perimeter with a contoured structure formed by cold working a metal piece.

A housing section made by cold-working a metal piece can be referred to as a stamped housing section. The housing section may be made using a coining process, which is a cold working process similar to forging, except the latter usually takes place at elevated temperatures. A die or multiple dies may be used in a coining process to first cut a blank and then shaping the blank into a refined shape, which can optionally further be machined or laser treated to further modify the final shapes and tolerances. The die or dies used to shape the blank may have different shapes and contours for forming a different shaped housing section, such as for forming different shaped contoured structures to produce different shaped spring grooves when joining two housing sections together to form a connector housing.

Generally speaking, the shaped housing section can be described as a negative image of the die or dies used to form the shaped section or sections. A great deal of force is used to plastically deform a blank or work piece. In one example, a hydraulic actuated press can be used to supply the working pressure. In other examples, a gear driven press or a mechanical press may be used to supply the working pressure.

Coining is similar to stamping with the difference primarily being the working force or pressure. Unless the context indicates otherwise, coining and stamping for purposes of the present disclosure are used synonymously.

Blank materials usable as the starting point for forming the disclosed housing section may be made from any number of conductive metals.

The outer perimeter of the connector housing can have multiple sides, such as two sides, three sides, four sides, or more than four sides. Each side should have a distinct side section or sections so that together they do not form a round or a circular outer perimeter. In contrast, prior art connector housings typically have round outer perimeters. By incorporating sides to an outer perimeter, the present connector housing can improve handling and assembly, such as by allowing the sides to be used as reference points, for line contacts with other flat surfaces, and/or for alignment, among others.

Two sides of the outer perimeter can connect to one another by a joining section. Two adjacent sides and one joining section therebetween are clearly distinct, have a change in axis or an inflection point, compared to an arc with a single radius or a straight line. Each joining section can be a corner with a small radius, a large radius, or be substantially right angle or 90 degrees. The joining section can alternatively be a corner tab, which can provide additional function than simply joining the sides.

For a four-sided outer perimeter, or for a perimeter with more than or fewer than four sides, the joining sections can be the same or different in size and/or shape. For example, one joining section can have a small radius while another joining section of the same perimeter can have a large radius.

The plurality of sides of the outer perimeter can be of equal size, such as to form a generally square shape outer perimeter with rounded joining sections, or of different sizes, such as to from a generally rectangular shape, or other polygonal shapes.

A stamped housing section can be formed to have flat sides in order to facilitate assembly and fitment in rectangular or square cavities. The term flat side can be understood to mean a generally straight or linear side. In some examples, each side can have multiple flat sections forming a side, as further discussed below. Thus, when a connector housing formed by using two housing sections of the present disclosure is installed or assembled into a cavity of an equipment or a component of a larger equipment, the outer perimeter of the connector housing with flat sides can form a fitment with a correspondingly shaped cavity. This arrangement allows for proper alignment between the connector housing and the cavity, anti-rotation or turning within the cavity, and facilitate assembly, among others.

In an alternative embodiment, the joining sections between two adjacent sides are not uniform or not the same. Two joining sections of multiple joining sections of a connector housing can have the same shape while other joining sections can have different shapes.

One of the sides 160 can be an active side with two slots formed near the joining sections. The slots can be provided in the flange section of the connector housing. The slots do not have a continuous perimeter defining the openings of the slots. Alternatively, holes with a continuous perimeter can be provided instead of the non-continuous perimeter.

The two slots can be the same or be different, such as one with a non-continuous perimeter and another with a continuous perimeter. The slots on the active side may be included to provide alignment along guiderails or rods within the assembly or equipment. Thus, in addition to aligning the straight side of the active side with a cavity, alignment and guidance capabilities can be provided with the slots of the present disclosure to ease and simplify assembly of the stamped housing sections within an assembly, such as within a connector stack or assembly for use with a header of an implantable medical device (IMD).

The holes or slots may facilitate welding of wires to the housing connector.

A connector housing can be provided with a plurality of holes, each with a continuous perimeter, in the flange section of the connector housing. The holes can be of the same size or be different. The holes may be included to provide alignment within the assembly or equipment.

Corner tabs can be provided instead of radiused joining sections at the corners with the active side. The corners tabs, because they join two adjacent sides, can also be considered joining sections.

The corner tabs can each be stamped with the respective housing section and then the two housing sections joined together, such as by welding, to form the connector housing. The corner tabs can offer extra flat material to facilitate handling of the connector housing. The corner tabs can also be useful as a guide or alignment means along a slot or cavity in a connector assembly or header, as well as providing further real estate for welding of wires or for use as leverage. The corner tabs may be thought of as extensions of the flat active side.

The corner tabs can be separately formed members or components that are attached to the body of the connector housing. For example, corner tabs can be machined or stamped extended members that are separately formed from the housing sections.

The two housing can be provided with fitment corners that are sized and shaped to receive the two corner tabs. In some examples, only a single corner tab is separately formed and subsequently attached to the body of the connector housing. The attachment can be made by welding. Notches and/or holes can be excluded from any of the connector housings but can be included.

In some examples, only a single unitarily formed corner tab is included as one of the joining sections that joins two sides and the remaining joining sections can be radiused joining sections. For example, the joining sections 162 have two different radiuses.

In some examples, the two corner tabs are made from different materials than from the two housing sections. The corner tabs can also be formed from a single layer along a thickness thereof rather than from two or more layers. The corner tabs can be made from a metal material or from a non-metallic material, such as from engineered plastic. If the corner tabs are made from a metal material, they can attach to the body of the connector housing by welding. If the corner tabs are made from a non-metallic material, they can attach to the body of the connector housing using adhesive, press-fit, fasteners, detents, or combinations thereof.

In some examples, one or both housing sections for forming the body of the connector housing can have a first section 190 formed by cold-working a metal material and a second section made from a plastic material, such as from an engineered plastic, or from a metal material. The second section can be provided with an outside diameter that fits with an inside diameter of the first section. The attachment can be by welding if the second section is made from a metal material or by adhesive, press-fit, fasteners, detents, or combinations thereof if the second section is made from a plastic material.

The second section can be generally flat or planar and has an inside perimeter defining a bore and an outside perimeter. The second section can be similar to a washer used with a bolt or a fastener.

In some examples, the connector housing can be formed from three housing sections, including a first housing section, a second housing section, and a third housing section. The three housing sections can be joined to one another to form a connector body with two seams.

The first and second housing sections of the connector body formed by three pieces can be formed by stamping. For example, the first and second housing sections can be stamped from two or more dies to create an outside perimeter with an outside diameter and an inside perimeter with an inside diameter. These pieces can be similar to a washer. The third housing section can shape as a cylindrical body and can be formed by cutting or machining a length of tubing and the like.

The first and second housing sections can attach to the third housing section, which can all be made from one of the conductive metal materials discussed elsewhere herein, by welding.

A connector housing comprising a connector body or body having a spring groove can be formed by cold working a single piece structure. In an example, the single piece structure can be a section of a tube having a length, a thickness, an inside diameter, an outside diameter, a bore, and two end openings.

The tubing section or single piece structure can be a soft metal material, such as copper, brass, or alloys thereof, and can optionally be plated or cladded with a different metallic layer, internally, externally, or both. The single piece structure can be cold-worked while supporting two end sections and allowing a central section to bulge or expand radially outwardly from the lengthwise axis of the connector body.

Internal and external dies can be used to shape the central section of the single piece structure to produce two sidewalls and a bottom wall therebetween to form the spring groove. The connector housing in accordance with aspects of the present disclosure therefore has a connector body with a spring groove formed by stamping a single piece or a unitary piece to form the desired spring groove shape, which can have two sidewalls and a bottom wall located therebetween.

The length of the two end sections on either side of the central section or on either side of the spring groove can be the same or different. Further, the length of either end section can be machined or cut after the stamping process.

An aspect of the connector housing is understood to include a connector body having a spring groove formed entirely by stamping a tubing section to produce two sidewalls and a bottom wall therebetween to receive a canted coil spring, which can be a radial canted coil spring or an axial canted coil spring.

In an example, the spring groove has internal radiused corners at the entrance of the opening of the spring groove and radiused corners at the bottom of the spring groove.

In an example, a connector housing having a body having a spring groove can be formed entirely by stamping a tubing section to produce two sidewalls and a bottom wall therebetween to receive a canted coil spring.

The connector body can have two end sections and a central section and wherein the spring groove can be located between the two end sections and at the central section.

In an example, each of the two end sections can comprise an outside diameter and the central section can comprise an outside diameter, and wherein the outside diameter of the central section is larger than the outside diameters of the two end sections.

The outside diameters of the two end sections can be the same.

The different outside diameters, such as the larger outside diameter of the central section, can be created by cold working the central portion to create an outwardly bulging section.

In some examples, the wall thickness of the two end sections and the wall thickness of the central section can be approximately the same. Any variation in the thickness can possibly be caused by the stamping process.

A method of cold working a piece of tubing to form a spring groove.

A connector housing comprising a connector body having a spring groove formed entirely by stamping a tubing section to produce two sidewalls and a bottom wall therebetween to receive a canted coil spring, and wherein the connector body comprises two end sections ach with an end opening and a central section located between the two end sections, and wherein an outside diameter of the central section is larger than outside diameters of the two end sections.

A housing section made with a first section and a second section can allow for standardization of housing parts. For example, a plurality of first sections can be pre-made for use different second sections with different inside perimeters to define different sized openings for forming different sized bores. This in turn can allow for connector housings to be made for use to receive different pins or piston sizes in the bores utilizing the same first sections but different sized second sections.

In an example, a pin can comprise an elongated pin body having an insertion end with a taper surface, such as a tapered insertion end, and a flat planar end surface extending across a lengthwise axis of the pin. The tapered insertion end can allow the pin to lift the canted coil spring to enable insertion of the pin into the spring center.

The pin body can be solid without an internal bore or lumen or but can include an internal bore. The pin body can have nominal outside diameter that is sized and shaped to pass through the opening of the connector housing and into the bore.

The canted coil spring positioned in the spring groove can contact the nominal outside diameter of the pin body in a holding application. The pin body can incorporate a pin groove for receiving the canted coil spring when the pin is inserted into the bore to latch the pin to the connector housing, which permits separation of the pin from the housing, or to lock the pin to the connector housing, which does not permit separation of the pin from the housing.

The pin can incorporate a shoulder, such as an enlarged diameter section. The pin can be permitted to move into the bore in a first direction to latch the pin to the housing but the shoulder can prevent the pin from continuing in the same first direction after the latching, as the shoulder can abut the side of the connector housing. However, the pin can move in the second direction opposite the first direction to unlatch from the connector housing. The pin can be made from a conductive metallic material and can comprise one of the conductive materials discussed elsewhere herein.

The pin groove of the pin can include two sidewalls and a bottom wall located therebetween. The two sidewalls can be generally parallel to one another or can converge or diverge. In some example, one of the sidewalls can be generally orthogonal to the lengthwise axis of the pin and the other one of the two sidewalls can be tapered. The one with the tapered sidewall surface can allow the pin to release from the connector housing following latching.

The bottom wall can be generally flat, which can be generally parallel to the lengthwise axis of the pin. In other examples, the bottom wall of the pin groove can have a V-shape, with or without a subtended flat surface between the two slanted surfaces. In still other examples, the bottom wall can have a single tapered bottom surface, which is tapered relative to the lengthwise axis.

The various groove geometries of the pin grooves and the spring grooves of the connector housings discussed herein can be selected to position the major and minor axes of the coils of the canted coil springs a desired way so as to generate the desired insertion force to insert the pin into the bore of the housing and the desired removal or disconnect force to remove the pin from the housing following latching. The particular groove geometries can also be selected to ensure locking between the pin and the housing.

In some examples, the canted coil spring can be pin mounted rather than housing groove mounted as shown herein.

The sides 160 of the housing sections or the sides of the connector housings descried herein can alternatively embody one of the shaped sides shown in FIGS. 12 and 12a-12d.

Methods of using and of making assembled connector housings and connector assemblies shown and described herein are within the scope of the present disclosure.

Aspects of the present disclosure can alternatively include a connector housing comprising: a first housing section comprising a body having an exterior surface, an interior surface, an outer perimeter with two or more sides with a joining section therebetween, an interior perimeter defining an on opening, and a contoured structure formed by stamping; a second housing section joined to the first housing section, said second housing section comprising a body having an exterior surface, an interior surface, an outer perimeter with two or more sides with a joining section therebetween, an interior perimeter defining an on opening, and a contoured structure formed by stamping; a spring groove formed by the two contoured structures having a canted coil spring located therein; and wherein the interior surfaces of the two housing sections contact one another adjacent the outer perimeter of each housing section; and wherein the openings of the two housing sections define a bore and the two outer perimeters define a housing perimeter.

A pin can be located in the bore.

A flange section can be include and wherein notches or holes can be provided in the flange section.

The housing perimeter can have four sides and four joining sections.

The first housing section can comprise a first section attached to a second section along the outer diameter of the second section.

At least one of the joining sections can be a corner tab extending outwardly from one of the sides.

The corner tab can attach to a fitment corner of the body.

A further aspect of the present disclosure can include a method of manufacturing a connector housing comprising: forming a first housing section by stamping, said first housing section comprising a body having an exterior surface, an interior surface, an outer perimeter with two or more sides with a joining section therebetween, an interior perimeter defining an on opening, and a contoured structure formed by stamping; forming a second housing section by stamping, said second housing section joined to the first housing section, said second housing section comprising a body having an exterior surface, an interior surface, an outer perimeter with two or more sides with a joining section therebetween, an interior perimeter defining an on opening, and a contoured structure formed by stamping; attaching the first housing section to the second housing section to form a spring groove from the two contoured structures; positioning a canted coil spring between the first housing section and the second housing section at the spring groove; and wherein the interior surfaces of the two housing sections contact one another adjacent the outer perimeter of each housing section; and wherein the openings of the two housing sections define a bore and the two outer perimeters define a housing perimeter.

The method can further comprise placing a pin into the bore.

The method can further comprise the step of forming a corner tab by extending a structure from one of the sides.

The method can further comprise attaching a first section to a second section to form the first housing section.

The method can further comprise forming one or more notches or one or more holes in the flange section of the connector housing.

The method can further comprise removing the pin from the connector housing.

BRIEF DESCRIPTION OF THE DRAWINGS

These and other features and advantages of the present devices, systems, and methods will become appreciated as the same becomes better understood with reference to the specification, claims and appended drawings wherein:

FIG. 1 is a schematic side view of a connector housing in accordance to a first embodiment.

FIG. 2 is a cross-sectional side view of the connector housing of FIG. 1 taken along line A-A.

FIG. 3 is a schematic side view of a connector housing in accordance to a second embodiment.

FIG. 4 is a schematic side view of a connector housing in accordance to a third embodiment.

FIG. 5 is a schematic side view of a connector housing in accordance to a fourth embodiment.

FIG. 6 is a schematic side view of a connector housing in accordance to a fifth embodiment.

FIG. 7 is a schematic side view of a connector housing in accordance to a sixth embodiment.

FIG. 8 is a schematic side view of a connector housing in accordance to a seventh embodiment and FIG. 9 is a cross-sectional end view of the connector housing of FIG. 9 taken along line B-B.

FIG. 10 is a schematic cross-sectional side view of a connector housing in accordance to an eight embodiment.

FIG. 14 is a schematic cross-sectional side view of a connector housing in accordance to a ninth embodiment.

FIG. 15 is a schematic cross-sectional side view of a connector housing in accordance to a tenth embodiment.

DETAILED DESCRIPTION

Figure 11:
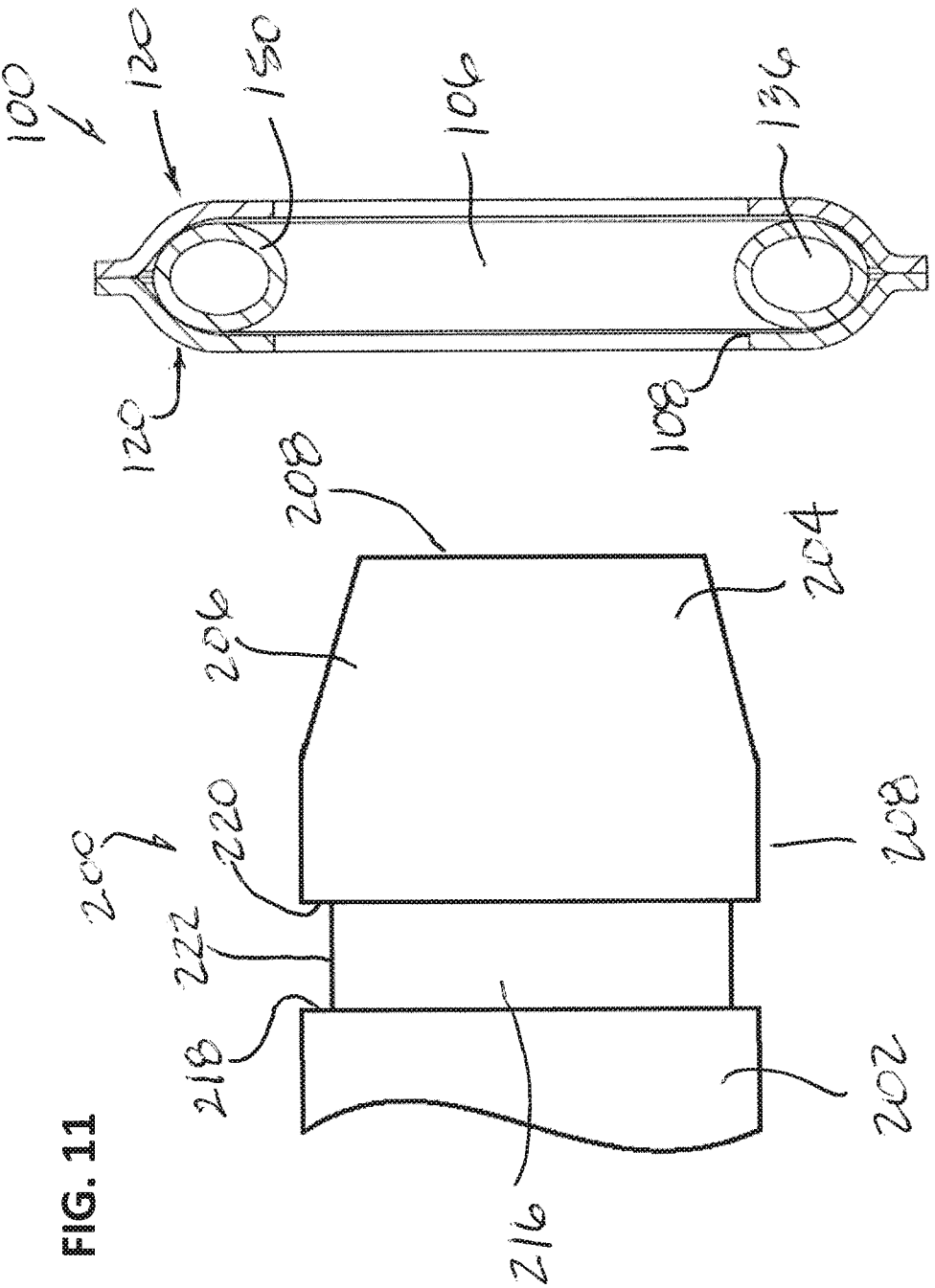
FIG. 11 is a schematic side view of a pin and a cross-sectional view of a connector housing in accordance with aspects of the present disclosure.

The detailed description set forth below in connection with the appended drawings is intended as a description of the presently preferred embodiments of connector assemblies and components provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Connector assemblies disclosed herein each comprises a connector housing with a groove that receives a canted coil spring and a pin with or without a pin groove inserted into a bore of the connector housing and into the spring center of the canted coil spring to hold, latch, or lock the pin and the housing to one another.

A canted coil spring usable herein may be an axial canted coil spring or a radial canted coil spring. The canted coil spring comprises a plurality of coils all canted in the same general direction with each coil comprising a major axis and a minor axis. The coils can expand and compress like a traditional helical compression or extension spring but can also cant or deflect along a radial direction relative to the axis passing through the plurality of interconnected coils, unlike traditional helical compression or extension spring, which cannot deflect in the comparable radial direction. In other examples, the spring can be a garter spring, a cantilever spring, or a ribbon spring.

Exemplary canted coil springs are disclosed in U.S. Pat. Nos. 4,655,462; 4,826,144; and 4,876,781, the contents of which are expressly incorporated herein by reference. Canted coil springs usable herein can be made from a conductive metal, such as a conductive metal wire, and may be plated or cladded with one or more outer layers over a base metallic layer. As used herein, conductive metal means any metal capable of conducting current, such as steel, stainless steel, copper, and gold.

In certain embodiments, a preferred conductive metal, such as copper, copper alloy, or a preferred combination, such as copper with silver or other noble metal cladding, may be used. For high temperature applications, a soft base metal may be used with a high tensile strength outer layer, such as a copper core with a stainless steel outer layer. In another example, the combination may be practiced in the reverse, i.e., with the high tensile strength material as the base core material and the high conductive property material, such as copper, as the cladding outer layer. In still yet other examples, the high tensile strength property material can include heat treated carbon steel, INCONEL® alloys, and HASTELLOY® alloys. INCONEL alloys are understood to include a family of nickel-chromium-based super alloys. HASTELLOY are understood to include a family of nickel based super alloys that include varying percentages of elements such as molybdenum, chromium, cobalt, iron, manganese, etc. In an example, the second conductive clad layer having high conductivity can include copper, copper alloy, aluminum, aluminum alloy, gold, gold alloy, silver, silver alloy, brass, or brass alloy. The combination with a high tensile strength base material and a conductive cladding material is configured to offer high conductivity as well as retain high tensile and high modulus properties at elevated temperatures. The high conductivity layer is preferably positioned on the side of the spring that contacts or faces a pin (not shown). However, in another embodiment, the high tensile strength material can contact or face the pin.

With reference now to FIG. 1, a housing or connector housing 100 is shown comprising a body 102 having an outer body perimeter or housing perimeter 104 and a bore 106 defined by an inside perimeter 108. The inside perimeter 108 defines an opening and the two openings aligned to receive a pin. The body 102 further comprises a flange section 110 and a contoured or shaped section 112 located radially inwardly from the flange section 110. As further discussed below, the contoured section 112 of two connected housing sections can define a spring groove. In an example, the connector housing 100 is formed by joining two or more housing sections 120 together. The two or more housing sections 120 can be joined by various means, including by welding their perimeters together, by crimping the perimeters, by using fasteners, or by using rivets. In the embodiment shown, the body 102 of the housing 100 can be formed by securing two housing sections 120 together, such as by welding the outer perimeter 104 of the two housing sections together. The size of the inside perimeter 108 and the overall size of the connector housing 100 can be selected to fit different situations and applications.

FIG. 2 is a schematic cross-sectional view of the housing 100 of FIG. 1 taken along lines A-A.

With reference to FIG. 2 in addition to FIG. 1, the body 102 is shown comprising two housing sections 120 each with a body 102 attached to one another along a seam 124. In one example, the outer perimeter 104a of the two housing sections 120 can be the same, such as the same shape and/or size, so that the outer edges of the respective outer perimeters 104a share a common outer perimeter 104, as shown. In other examples, the outer perimeter 104a of each housing section 120 is different from the other in shape and/or size so that while they can still share a seam 124 therebetween, there is no common outer perimeter 104.

Each housing section 120 has a flange structure 110a, a contoured or shaped structure 112a, an exterior surface 128, and an interior surface 130. Each housing section 120 also has an opening defined by an interior perimeter 108, which defines a bore 106. In an example, the two housing sections 120 contact one another at the interior surfaces 130 of their respective flange structures 110a, as opposed to contacting at the edges of their respective outer perimeters 104a.

When the two housing sections 120 are joined to form the connector housing 100, a spring groove 136 is defined by the two housing sections. As shown, the spring groove 136 comprises two sidewalls 138, 140 and a bottom wall 142 located therebetween. The two sidewalls 138, 140 can be formed from all or part of the contoured structures 112a, 112a of the two housing sections 120. The bottom wall 142 can also be formed by the two contoured structures 112a, 112a and can have a seam 124 passing therethrough.

The spring groove 136 has a width measured by the spacing between the two sidewalls 138, 140 and a groove depth measured from the groove bottom to a point defined by the two inside perimeters 108 of the two housing sections. In an example, the groove depth and the groove width can be selected so as to accommodate an axial canted coil spring, a radial canted coil spring, or either of the radial or axial canted coil spring but rotated from each spring's normal coiled position. For example, when using a radial canted coil spring, the major axis can be rotated from horizontal or when using an axial canted coil spring, the major axis can be rotated from vertical. Both horizontal and vertical can be measured relative to a housing axis passing through the bore 106 of the housing 100, which is horizontal in the cross-sectional view of FIG. 2. As shown, the canted coil spring 150 positioned in the spring groove 136 is an axial canted coil spring comprising a plurality of coils 152 all canted along the same general direction.

In an example, the spring groove 136 can have two generally parallel sidewalls 138, 140, such as shown in FIG. 2. In other examples, the sidewalls 138, 140 can converge or diverge from one another, such as being tapered as opposed to orthogonal to the housing axis. The bottom wall 142 can be general U-shaped, as shown in FIG. 2, generally V-shaped, can have a flat bottom, or can have a single taper as opposed to being parallel to the housing axis. The various groove geometries of the spring groove 136 can be implemented, formed, or adjusted by changing the shape of the contoured structures 112a, 112a of the two housing sections 120, 120.

The assembled housing sections 120, 120 with a spring groove and a canted coil spring can accept a pin or a shaft (FIG. 11) so that the canted coil spring is biased between the housing and the shaft. A pin or piston can be inserted in through the bore 106 of the housing 100 and the pin can either latch to the housing 100 via the canted coil spring 150, lock to the housing 100, or be held to the housing 100 by the canted coil spring 150.

One or both housing sections 120, 120 of the housing 100 of FIG. 2 can be formed by cold working a metal piece to shape the metal piece into the shaped housing section 120 shown. For example, for a two-piece connector housing 100, both housing sections 120 can be formed by cold working a metal piece, only one housing section is formed by cold working a metal piece while the other is machined, or both housing sections 120, 120 can have sections formed by cold-working while other sections by machining. The two housing sections 120, 120 can be substantially identical or be different, such as to produce a non-symmetrical spring groove 136 about the seam 124. In some example, a housing section 120 can have both a cold-worked section and a machined section, such as a cut or a lathed inner perimeter 108 with a contoured structure 112a formed by cold working a metal piece.

A housing section 120 made by cold-working a metal piece can be referred to as a stamped housing section. The housing section 120 may be made using a coining process, which is a cold working process similar to forging, except the latter usually takes place at elevated temperatures. A die or multiple dies may be used in a coining process to first cut a blank and then shaping the blank into a refined shape, which can optionally further be machined or laser treated to further modify the final shapes and tolerances. The die or dies used to shape the blank may have different shapes and contours for forming a different shaped housing section, such as for forming different shaped contoured structures to produce different shaped spring grooves 136 when joining two housing sections 120 together to form a connector housing 100.

Generally speaking, the shaped housing section 120 can be described as a negative image of the die or dies used to form the shaped section or sections. A great deal of force is used to plastically deform a blank or work piece. In one example, a hydraulic actuated press is used to supply the working pressure. In other examples, a gear driven press or a mechanical press may be used to supply the working pressure. Coining is similar to stamping with the difference primarily being the working force or pressure. Unless the context indicates otherwise, coining and stamping for purposes of the present disclosure are used synonymously.

Blank materials usable as the starting point for forming the disclosed housing section 120 may be made from any number of conductive metals. Examples of metals that are capable of conducting current include steel, stainless steel, copper, and gold. Additionally, stainless steel type 316L, MP35N, platinum-iridium, titanium and others may be used. Alternatively, the material can be conventional medically implantable grade material with noble metal coatings, such as platinum over stainless steel. By coating a non-noble metal element with a noble metal, the more desirable conductive and corrosion resistant properties of the noble metal are married with the significantly lower cost of non-noble metals such as high-strength nickel alloys and stainless steel. Thus, the shaped housing section 120 may be understood to be made from a single metal material or a multi-layer metal material with the latter having a base metal layer and one or more cladding or plating over-layers. For certain connector applications, plastic injection molding may also be employed to form the housing section, as further discussed below. For pure mechanical applications without current or signal carrying capability, two injection molded housing sections 120 may be joined with a canted coil spring located in between to form a connector housing 100.

With reference again to FIG. 1, the outer perimeter 104 of the connector housing 100 is shown with multiple sides 160, such as two sides, three sides, four sides, or more than four sides. Each side 160 should have a distinct side section or sections so as together not form a round or circular outer perimeter 104. In contrast, prior art connector housings typically have round outer perimeters. As further discussed below, by incorporating sides to an outer perimeter, the present connector housing 100 improves handling and assembly, such as by allowing the sides 160 to be used as reference points, for line contacts with other flat surfaces, and/or for alignment, among others.

Two sides 160 of the outer perimeter 104 can connect to one another by a joining section 162. Two adjacent sides 160 and one joining section 162 therebetween are clearly distinct, have a change in axis or an inflection point, in contrast to an arc with a single radius or a straight line. Each joining section 162 can be a corner with a small radius, a large radius as shown in FIG. 2, or be substantially right angle or 90 degrees. For a four-sided outer perimeter 104, or for a perimeter with more than or fewer than four sides, the joining sections 162 can be the same or different. For example, one joining section 162 can have a small radius while another joining section 162 of the same perimeter 104 can have a large radius. The plurality of sides 160 of the outer perimeter 104 can be of equal size, such as to form a generally square shape outer perimeter with rounded joining sections, or of different sizes, such as to form a generally rectangular shape, or other polygonal shapes.

A stamped housing section 120 can be formed to have flat sides 160 in order to facilitate assembly and fitment in rectangular or square cavities. The term flat side can be understood to mean a generally straight or linear side. In some examples, each side 160 can have multiple flat sections forming a side, as further discussed below. Thus, when a connector housing 100 formed by using two housing sections 120, 120 of the present disclosure is installed or assembled into a cavity of an equipment or a component of a larger equipment, the outer perimeter 104 with flat sides 160 form a fitment with a correspondingly shaped cavity. This arrangement allows for proper alignment between the connector housing 100 and the cavity, anti-rotation or turning within the cavity, and facilitate assembly, among others.

With reference now to FIG. 3, a connector housing 100 in accordance with further aspects of the present disclosure is shown. The present housing 100 is similar to one of the connector housing 100 of FIGS. 1 and 2 with a few exceptions. A canted coil spring 150 (not shown), such as a radial or an axial a canted coil spring similar to the spring 150 of FIG. 2, may be positioned in the spring groove of the connector housing 100 of FIG. 3. In the present embodiment, the joining sections 162 between two adjacent sides 160 are not uniform. In the example shown, two joining sections 162 can have the same shape while two other joining sections can have different shapes. As shown, two of the joining sections 162 can have small radiuses and the side 160 located therebetween can be considered an active side 170 used for handling and/or alignment.

As shown, the active side can have two slots 172 formed near the two joining sections 162. The slots 172 can be provided in the flange section 110 of the connector housing 100. The slots 172 do not have a continuous perimeter defining the openings of the slots. Alternatively, holes with a continuous perimeter can be provided instead of the non-continuous perimeter. The two slots can be the same or be different, such as one with a non-continuous perimeter and another with a continuous perimeter. The slots 172 on the active side 170 may be included to provide alignment along guiderails or rods within the assembly or equipment. Thus, in addition to aligning the straight side of the active side 170 with a cavity, alignment and guidance capabilities can be provided with the slots 172 to ease and simplify assembly of the stamped housing sections within an assembly, such as within a connector stack or assembly for use with a header of an implantable medical device (IMD), such as those disclosed in U.S. Pat. Nos. 8,690,609, 8,480,437, 8,437,855, and 8,328,587. Furthermore, such holes or slots 172 may facilitate welding of wires to the housing connector 100.

With reference now to FIG. 4, a connector housing 100 in accordance with further aspects of the present disclosure is shown. The present housing 100 is similar to the connector housing 100 of FIGS. 1-3 with a few exceptions. In the present embodiment, the four joining sections 162 are generally the same, such as having similar shaped radiuses. Further, a plurality of holes 174, each with a continuous perimeter, can be provided in the flange section 110 of the connector housing. In an example, four holes 174 can be provided at each of the four joining sections 162 of the connector housing 100. Alternatively, the holes 174 can each be off from center of the corresponding joining section 162.

The holes 174 may be included to provide alignment within the assembly or equipment. Thus, in addition to aligning the straight sides 160 with a cavity, alignment and guidance capabilities can be provided with the holes 174 to ease and simplify assembly of the stamped housing sections within an assembly, such as within a connector stack or assembly for use with a header.

With reference now to FIG. 5, a connector housing 100 in accordance with further aspects of the present disclosure is shown. The present housing 100 is similar to the connector housing 100 of FIGS. 1-4, and in particular to the connector housing 100 of FIG. 3 with a few exceptions. In the present embodiment, corner tabs 180 are provided instead of radiused joining sections 162 at the corners with the active side 170. The corners tabs 180, because they join two adjacent sides 160, can also be considered joining sections 162. The corner tabs 180 can each be stamped with the respective housing section 120 and then the two housing sections 120 joined together, such as by welding, to form the connector housing 100. The corner tabs 180 can offer extra flat material to facilitate handling of the connector housing. The corner tabs 180 can also be useful as a guide or alignment means along a slot or cavity in a connector assembly or header, as well as providing further real estate for welding of wires or for use as leverage. The corner tabs 180 may be thought of as extensions of the flat active side 170.

With reference now to FIG. 6, a connector housing 100 in accordance with further aspects of the present disclosure is shown. The present housing 100 is similar to the connector housing 100 of FIGS. 1-5, and in particular to the connector housing 100 of FIG. 5 with a few exceptions. In the present embodiment, the corner tabs 180 are separately formed members that are attached to the body 102 of the connector housing. For example, corner tabs 180 can be machined or stamped extended members that are separately formed from the housing sections 120. The two housing sections 120 are provided with fitment corners 182 that are sized and shaped to receive the two corner tabs 180. In some examples, only a single corner tab 180 is separately formed and subsequently attached to the body 102 of the connector housing 100. The attachment can be made by welding. Notches and/or holes are excluded from the present connector housing 100 but can be included.

With reference now to FIG. 7, a connector housing 100 in accordance with further aspects of the present disclosure is shown. The present housing 100 is similar to the connector housing 100 of FIGS. 1-6, and in particular to the connector housing 100 of FIG. 5 with a few exceptions. In the present embodiment, only a single unitarily formed corner tab 180 is included as one of the joining sections that joins two sides 160. As shown, the three remaining joining sections 162 can have two different radiuses. Notches and/or holes are excluded from the present connector housing 100 but can be included.

With reference now to FIG. 8, a connector housing 100 in accordance with further aspects of the present disclosure is shown. The present housing 100 is similar to the connector housing 100 of FIGS. 1-7, and in particular to the connector housing 100 of FIG. 6 with a few exceptions. In the present embodiment, the corner tabs 180 can be separately formed members that are attached to the body 102 of the connector housing, similar to that of FIG. 6. However, as shown in FIG. 9, which is a cross-sectional view taken along line B-B of FIG. 8, the two corner tabs 180 can be made from different materials than from the two housing sections 120, shown with different cross-hatchings. The corner tabs 180 can also each be formed from a single layer along a thickness thereof rather than from two or more layers. The corner tabs 180 of the present embodiment can be made from a metal material or from a non-metallic material, such as from engineered plastic. If the corner tabs are made from a metal material, they can attach to the body 102 by welding. If the corner tabs are made from a non-metallic material, they can attach to the body using adhesive, press-fit, fasteners, detents, or combinations thereof. Notches and/or holes are excluded from the present connector housing 100 but can be included.

With reference now to FIG. 10, a connector housing 100 in accordance with further aspects of the present disclosure is shown. The present housing 100 is similar to the connector housing 100 of FIGS. 1-8, and in particular to the connector housing 100 of FIGS. 1 and 2 with a few exceptions. In the present embodiment, one or both housing sections 120, 120 for forming the body 102 of the connector housing 100 has a first section 190 formed by cold-working a metal material, such as having a contoured section 112a, and a second section 192 made from a plastic material, such as from an engineered plastic, or from a metal material. The second section 192 can be provided with an outside diameter 194 that fits with an inside diameter 196 of the first section 190. The attachment can be by welding if the second section 192 is made from a metal material or by adhesive, press-fit, fasteners, detents, or combinations thereof if the second section is made from a plastic material.

The second section 192 can be generally flat or planar and can include an inside perimeter 108 defining a bore 106 and an outside perimeter 194. The second section 192 can be similar to a washer used with a bolt or a fastener. The present housing section 120 made with a first section 190 and a second section 192 can allow for standardization of housing parts. For example, a plurality of first sections 190 can be pre-made for use different second sections 192 with different inside perimeters 108 to define different sized openings for forming different sized bores 106. This in turn allows for connector housings 100 to be made for use to receive different pin or piston sizes in the bore 106 utilizing the same first sections 190 but different sized second sections 192.

With reference now to FIG. 11, a connector housing 100 in accordance with further aspects of the present disclosure is shown with a pin or piston 200. The present connector housing 100 can be similar to one of the connector housings 100 of FIGS. 1-10 and is shown with a pin 200 to demonstrate how the connector housing 100 can interact with the pin. In an example, the pin 200 can comprise an elongated pin body 202 having an insertion end 204 with a taper surface 206, such as a tapered insertion end, and a flat planar end surface 208 extending across a lengthwise axis of the pin. The tapered insertion end 206 allows the pin to lift the canted coil spring 150 to enable insertion of the pin into the spring center.

The pin body 202 can be solid without an internal bore or lumen or but can include an internal bore. The pin body 202 can have nominal outside diameter 208 that is sized and shaped to pass through the opening 109 of the connector housing 100 and into the bore 106. The canted coil spring 150 is positioned in the spring groove 136 and can contact the nominal outside diameter 208 of the pin body 202 in a holding application. As shown, the pin body 202 incorporates a pin groove 216 for receiving the canted coil spring 150 when the pin is inserted into the bore 106 to latch the pin to the connector housing, which permits separation of the pin from the housing, or to lock the pin to the connector housing, which does not permit separation of the pin from the housing.

In some examples, the pin 200 can incorporate a shoulder, such as an enlarged diameter section, to the left of the pin groove 216 of FIG. 11. The pin 200 can be permitted to move into the bore 106 in a first direction to latch the pin to the housing but the shoulder prevents the pin from continuing in the first direction after the latching, as the shoulder abuts the side of the connector housing. However, the pin can move in the second direction opposite the first direction to unlatch from the connector housing. The pin 200 can be made from a conductive metallic material and can comprise one of the conductive materials discussed elsewhere herein.

The pin groove 216 is shown with two sidewalls 218, 220 and a bottom wall located therebetween. The two sidewalls 218, 220 can be generally parallel to one another or can converge or diverge. In some example, one of the sidewalls can be generally orthogonal to the lengthwise axis of the pin 200 one the other one of the two sidewalls is tapered. The tapered sidewall surface can allow the pin to release from the connector housing following latching.

The bottom wall 222 can be generally flat as shown, which is generally parallel to the lengthwise axis of the pin. In other examples, the bottom wall 222 can have a V-shape, with or without a subtended flat surface between the two slanted surfaces. In still other examples, the bottom wall 222 can have a single tapered bottom surface, which is tapered relative to the lengthwise axis. The various groove geometries of the pin groove 216 and the spring groove 136 of the connector housing 100 can be selected to position the major and minor axes of the coils of the canted coil spring 150 a desired way so as to generate the desired insertion force to insert the pin into the bore of the housing and the desired removal or disconnect force to remove the pin from the housing following latching. The particular groove geometries can also be selected to ensure locking between the pin and the housing.

In some examples, the canted coil spring 150 can be pin mounted rather than housing groove mounted as shown in FIGS. 1 and 11.

Figure 12A:
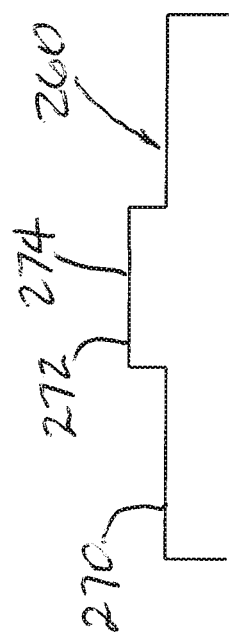
FIGS. 12 and 12a-12d show schematic views of a connector housing with alternative shaped sides.
Figure 12B:
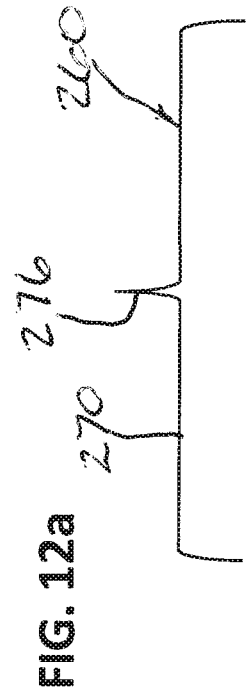
Figure 12C:
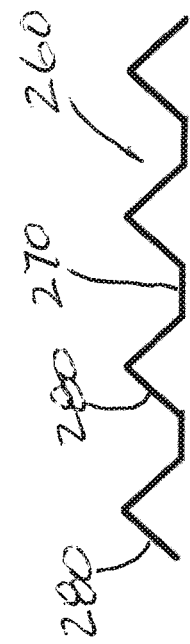
Figure 12D:
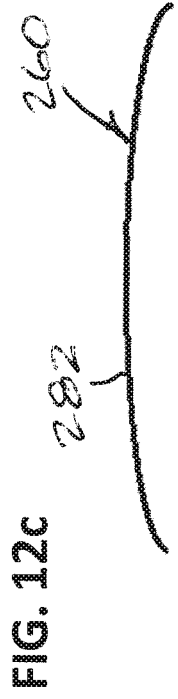
Figure 12:
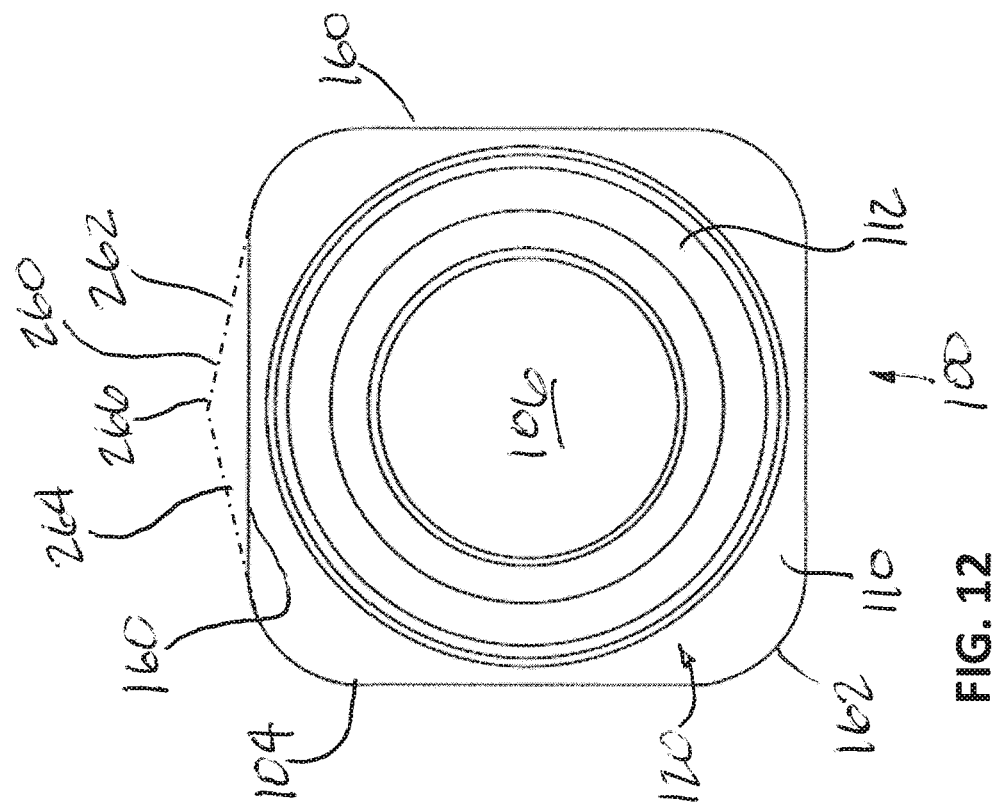

With reference now to FIG. 12, a connector housing 100 in accordance with further aspects of the present disclosure is shown. The present housing 100 is similar to the connector housing 100 of FIGS. 1-11, and in particular to the connector housing 100 of FIG. 1 with a few exceptions. In the present embodiment, one or more of the sides 160 of the perimeter 104 of the connector housing 100 can be modified to incorporate other edge or side features. As shown in dash-lines, the generally straight side 160 can be modified to include shaped side 260 having a shallow inverted V-shape with two side edge sections 262, 264 and an apex 266. One or more than one of the sides 160 of the perimeter 104 can be modified to have a shaped side 260. Further, the shaped side 260 can embody other shapes, other than a shallow inverted V-shape. The connector housing can incorporate notches and/or holes and optional corner tabs.

FIG. 12*a* depicts an alternative shaped side 260, similar to the shallow inverted V-shape of FIG. 12, which can be incorporated as one of the sides 160 of the perimeter 104 of the various connector housings 100 described elsewhere herein. The shaped side 260 of the present embodiment comprises a side edge 270 having a tab 272 with a flat tab edge 274 projecting therefrom.

FIG. 12*b* depicts an alternative shaped side 260, similar to the shaped side of FIGS. 12 and 12*a*, which can be incorporated as one of the sides 160 of the perimeter 104 of the various connector housings 100 described elsewhere herein. The shaped side 260 of the present embodiment comprises a side edge 270 having a tab 276 with a pyramid or pointed shape projecting from the side edge.

FIG. 12*c* depicts an alternative shaped side 260, similar to the shaped side of FIGS. 12, 12*a*, 12*b* and 12*c*, which can be incorporated as one of the sides 160 of the perimeter 104 of the various connector housings 100 described elsewhere herein. The shaped side 260 of the present embodiment comprises a side edge 270 having a plurality of teeth 280 extending therefrom, similar to a saw blade. In some examples, the intermediate straight side edge sections 270 can be omitted and the teeth interconnected with one another.

FIG. 12*d* depicts an alternative shaped side 260, similar to the shaped side of FIGS. 12, 12*a*, 12*b*, 12*c*, and 12*d*, which can be incorporated as one of the sides 160 of the perimeter 104 of the various connector housings 100 described elsewhere herein. The shaped side 260 of the present embodiment comprises a side edge 270 a curved or arcuate surface, having a complex curve.

Figure 13:
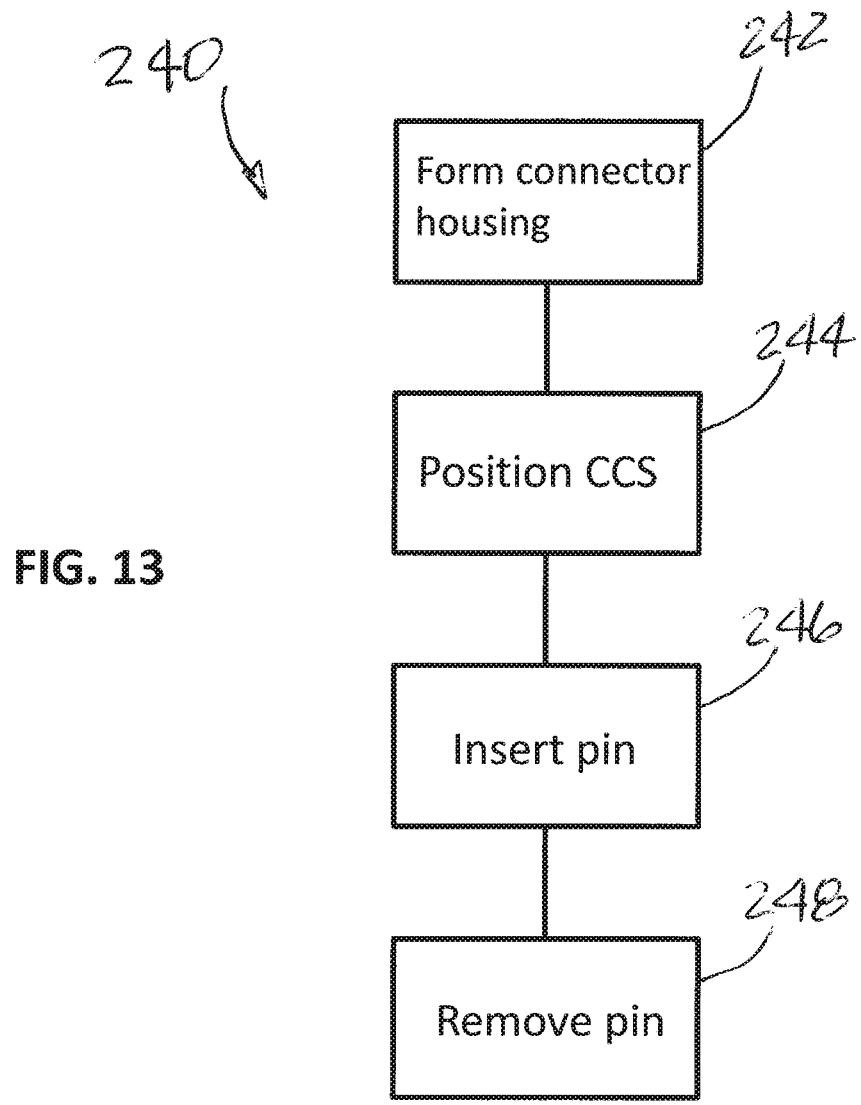
FIG. 13 is a method of making and using a connector housing of the present disclosure.

FIG. 13 depicts a method 240 of manufacturing a connector assembly and for using the connector assembly of the present disclosure. At step 242, the method comprises forming a connector housing 100 comprising two or more housing sections 120 and wherein at least one of the two housing sections comprises a contoured area that is formed by cold working a metal material. The connector housing 100 can include structural features discussed elsewhere herein and comprises a spring groove and a plurality of sides 160.

A canted coil spring is placed into a spring groove at 244, which can be a pin groove or a housing spring groove. In some examples the canted coil spring 150 can be place between two housing sections 120 before the two housing sections are joined together, such as welded together. The connector housing is complete at 244 and ready for shipping or for use with other components.

At 246, the process can further comprise inserting a pin into a bore of the connector housing and the spring ring center, to hold, latch, or lock the pin to the housing. The pin can be one of the pins discussed elsewhere herein.

Optionally, the process includes step 248, which comprises removing the pin from the connector housing.

FIG. 14 is a schematic cross-sectional side view of a connector housing 100 in accordance with aspects of the present disclosure. The connector housing 100 has a connector body or body 290 comprising two sidewalls 292, 294 and a center wall 296 located between the two sidewalls. The three walls 292, 294, 296 define a spring groove 136 having a canted coil spring 150 located therein. As shown, the canted coil spring 150 is a radial canted coil spring, which has a major axis that is parallel to the central axis of the bore 106. In other examples, the canted coil spring can be an axial canted coil spring.

In an example, the present connector housing 100 can be formed from three housing sections, including a first housing section 300, a second housing section 302, and a third housing section 304. The three housing sections 300, 302, 304 are joined to one another to form the body 290 with two seams 124. In an example, the first and second housing sections 300, 302 can be formed by stamping. For example, the first and second housing sections can be stamped from two or more dies to create an outside perimeter 310 with an outside diameter and an inside perimeter 108 with an inside diameter. The third housing section 304 can shape as a cylindrical body and can be formed by cutting or machining a length of tubing and the like.

The two inside perimeters 108 of the first and second housing sections 300, 302 are aligned to form two end openings into the bore 106 of the connector housing 100. A pin, such as the pin 200 of FIG. 11, can be inserted into the bore 106 to hold, latch, or lock the pin to the connector housing 100. The first and second housing sections 300, 302 can attach to the third housing section 304, which can all be made from one of the conductive metal materials discussed elsewhere herein, by welding.

With reference now to FIG. 15, a schematic cross-sectional side view of a connector housing 100 in accordance with further aspects of the present disclosure. The present connector housing comprises a connector body or body 320 having a spring groove 136 formed by cold working a single piece structure 322. In an example, the single piece structure 322 is a section of a tube having a length, a thickness, an inside diameter, an outside diameter, a bore, and two end openings 324. The tubing section or single piece structure 322 can be a soft metal material, such as copper, brass, or alloys thereof, and can optionally be plated or cladded with a different metallic layer, internally, externally, or both. The single piece structure 322 is cold-worked while supporting two end sections 330 and allowing a central section 332 to bulge or expand radially outwardly from the lengthwise axis of the connector body 320. Internal and external dies are used to shape the central section 332 to produce two sidewalls 336, 338 and a bottom wall 340 therebetween to form the spring groove 136. The length of the two end sections 330 on either side of the central section 332 can be the same or different. Further, the length of either section can be machined or cut after the stamping process.

In an example, the spring groove 136 has internal radiused corners 350 at the entrance of opening of the spring groove and radiused corners 352 at the bottom of the spring groove.

The connector housing 100 is configured to receive a pin, such as the pin 200 of FIG. 11, which can be inserted into the bore 106 to hold, latch, or lock the pin to the connector housing 100.

Thus, aspect of the connector housing 100 is understood to include a connector body 320 having a spring groove 136 formed entirely by stamping a tubing section to produce two sidewalls 336, 338 and a bottom wall 340 therebetween to receive a canted coil spring 150, which can be a radial canted coil spring or an axial canted coil spring.

In an example, a connector housing 100 having a body 320 having a spring groove 136 formed entirely by stamping a tubing section to produce two sidewalls 336, 338 and a bottom wall 340 therebetween to receive a canted coil spring 150. The connector body 320 can have two end sections 330 and a central section 332 the spring groove being located between the two end sections 330 and at the central section 332. In an example, each of the two end sections 330 comprises an outside diameter and the central section comprises an outside diameter, and wherein the outside diameter of the central section is larger than the outside diameters of the two end sections. The different outside diameters can be created by cold working the central portion to create an outwardly bulging section. In some examples, the wall thickness of the two end sections and the wall thickness of the central section are approximately the same with possible variations caused by the stamping process.

Methods of using and of making assembled connector housings shown and described herein are within the scope of the present disclosure.

Although limited embodiments of the connector housings, connector assemblies and their components have been specifically described and illustrated herein, many modifications and variations will be apparent to those skilled in the art. For example, the various sides, perimeters, and bore openings may incorporate different shapes than described. Furthermore, it is understood and contemplated that features specifically discussed for one connector housing may be adopted for inclusion with another connector housing, provided the functions are compatible. For example, holes, notches, and corner tabs may be used in another embodiment shown currently without them. The shapes of the holes and notches can also embody other shapes than as shown and described. Accordingly, it is to be understood that the connector housings and connector assemblies and their components constructed according to principles of the disclosed device, system, and method may be embodied other than as specifically described herein. The disclosure is also defined in the following claims.

What is claimed is:

1. A method of manufacturing a connector comprising:
    forming a first housing section by stamping, said first housing section comprising a body having an exterior surface, an interior surface, an outer perimeter with two or more sides with a joining section located between two adjacent sides, an inner perimeter defining an opening, and a contoured structure;
    forming a second housing section by stamping, said second housing section joined to the first housing section, said second housing section comprising a body having an exterior surface, an interior surface, an outer perimeter with two or more sides with a joining section located between two adjacent sides, an inner perimeter defining an opening, and a contoured structure;
    attaching the first housing section to the second housing section to form a spring groove from the two contoured structures;
    positioning a canted coil spring between the first housing section and the second housing section at the spring groove;
    welding the two housing sections together along at least part of the outer perimeters of the two housing sections to form a joined housing; and
    wherein the openings of the two housing sections define a bore and the two outer perimeters define a housing perimeter.

2. The method of claim 1, further comprising placing a pin into the bore.

3. The method of claim 2, wherein the pin comprises a pin groove and the canted coil spring is biased against the pin groove.

4. The method of claim 1, further comprising the step of forming a corner tab by extending a structure from one of the sides.

5. The method of claim 1, further comprising attaching a first section to a second section to form the first housing section.

6. The method of claim 1, further comprising forming one or more notches or one or more holes in the flange section of the connector housing.

7. The method of claim 2, further comprising removing the pin from the connector housing.

8. The method of claim 1, wherein the connector is made of metallic materials for use as an electrical connector.

9. The method of claim 1, wherein the joined housing has an active side comprising at least one of a slot, a corner tab, a fitment corner tab, a tab, teeth, and a curved surface.

10. A method of manufacturing a connector comprising:
    providing a tubing section having a body with a bore, a first end, and a second end and a first length measured between the first end and the second end;
    cold working the tubing section by shorting the first length to a second length and forming a spring groove between the first end and the second end; and
    placing a canted coil spring in the groove.

11. The method of claim 10, wherein the spring groove is formed entirely by cold working to produce two sidewalls and a bottom wall therebetween.

12. The method of claim 10, wherein the first end has a first exterior dimension and the second end has a second exterior dimension and wherein an exterior dimension at the spring groove is larger than the first exterior dimension and the second exterior dimension.

13. The method of claim 10, wherein the canted coil spring is a radial canted coil spring.

14. The method of claim 10, further comprising placing a pin into the bore.

15. The method of claim 14, wherein the pin comprises a pin groove and wherein the canted coil spring is biased against the pin groove.

16. The method of claim 10, wherein the tubing section is made from a soft metal material.

17. The method of claim 16, wherein the soft metal material is at least one of copper, brass, or alloys thereof.

18. The method of claim 17, wherein the tubing section is plated or cladded with a different metallic layer, internally, externally, or both.

19. A method of manufacturing a connector comprising:
attaching two plates each with an outside perimeter and an inside perimeter defining an opening to a cylinder section to form a groove; wherein the cylinder section has an inside diameter and wherein the two openings of the two inside perimeters are smaller than the inside diameter of the cylinder section;
placing a canted coil spring in the groove; and
placing a pin in contact with the canted coil spring.

20. The method of claim 19, wherein the canted coil spring has an inside diameter and wherein the inside diameter of the canted coil spring is smaller than the two inside perimeters.

\* \* \* \* \*